(12) United States Patent
Heath et al.

(10) Patent No.: US 8,144,442 B1
(45) Date of Patent: Mar. 27, 2012

(54) POWER PROTECTION IN A MULTI-LEVEL POWER HIERARCHY

(75) Inventors: Taliver B. Heath, Mountain View, CA (US); Amir M. Michael, San Mateo, CA (US)

(73) Assignee: Google Inc., Mountain View, CA (US)

( * ) Notice: Subject to any disclaimer, the term of this patent is extended or adjusted under 35 U.S.C. 154(b) by 400 days.

(21) Appl. No.: 12/185,324

(22) Filed: Aug. 4, 2008

Related U.S. Application Data

(60) Provisional application No. 61/078,086, filed on Jul. 3, 2008.

(51) Int. Cl.
*H02H 3/00* (2006.01)
(52) U.S. Cl. ............... 361/64; 361/62; 361/63
(58) Field of Classification Search .......... 361/35, 361/36, 62, 63, 64, 66
See application file for complete search history.

(56) References Cited

U.S. PATENT DOCUMENTS

| | | | | |
|---|---|---|---|---|
| 2,091,430 A | * | 8/1937 | Conrad ...................... | 337/275 |
| 4,724,502 A | * | 2/1988 | Kawahira et al. ............ | 361/62 |
| 5,412,593 A | * | 5/1995 | Magel et al. ................. | 365/96 |
| 5,659,182 A | * | 8/1997 | Cohen ......................... | 257/50 |
| 5,666,480 A | * | 9/1997 | Leung et al. ................. | 714/1 |
| 6,686,768 B2 | * | 2/2004 | Comer ......................... | 326/38 |
| 6,999,291 B2 | * | 2/2006 | Andarawis et al. ........... | 361/64 |
| 7,196,884 B2 | * | 3/2007 | Guzman-Casillas et al. ... | 361/36 |
| 7,432,755 B1 | * | 10/2008 | Park et al. .................... | 327/525 |
| 7,570,471 B2 | * | 8/2009 | Weiher et al. ................. | 361/64 |
| 8,037,005 B2 | * | 10/2011 | Willaeys et al. .............. | 706/48 |
| 2004/0243377 A1 | * | 12/2004 | Roytelman .................. | 703/18 |
| 2005/0052801 A1 | * | 3/2005 | Ghali ........................... | 361/62 |
| 2006/0114630 A1 | * | 6/2006 | Culligan et al. ............... | 361/62 |
| 2008/0310062 A1 | * | 12/2008 | Kumfer et al. ................ | 361/62 |
| 2010/0039741 A1 | * | 2/2010 | Booth et al. .................. | 361/63 |

* cited by examiner

*Primary Examiner* — Jared Fureman
*Assistant Examiner* — Angela Brooks
(74) *Attorney, Agent, or Firm* — Foley & Lardner LLP

(57) ABSTRACT

Embodiments of a multi-level power hierarchy are described. This power hierarchy contains a higher level, which includes a first sub-circuit, and a lower level, which includes a second sub-circuit and a third sub-circuit. Moreover, the second sub-circuit and the third sub-circuit are included in branches in the power hierarchy and are separately electrically coupled to the first sub-circuit. A given sub-circuit in a given level includes programmable power protection which is configured to protect sub-circuits at higher levels of the power hierarchy from power variations associated with changes in load on branches at lower levels of the power hierarchy, thereby providing failure isolation in the power hierarchy.

21 Claims, 5 Drawing Sheets

400

```
DETECT TRIPPING OF A PROGRAMMABLE POWER PROTECTION FOR ONE OF
THE SUB-CIRCUITS IN A POWER HIERARCHY, WHERE THE SUB-CIRCUITS ARE
ARRANGED IN LEVELS IN THE POWER HIERARCHY, AND A SUB-CIRCUIT IN A
HIGHER LEVEL MAY BE SEPARATELY ELECTRICALLY COUPLED TO TWO OR
MORE SUB-CIRCUITS THAT ARE INCLUDED IN BRANCHES ON A LOWER LEVEL
IN THE POWER HIERARCHY
410
```

```
ADJUST A PROGRAMMABLE PROTECTION THRESHOLD OF A PROGRAMMABLE
POWER PROTECTION SO THAT A FREQUENCY OF THE TRIPPING IS REDUCED
WITHOUT INCREASING A FREQUENCY OF TRIPPING OF ANOTHER
PROGRAMMABLE POWER PROTECTION AT THE HIGHER LEVEL IN THE POWER
HIERARCHY
412
```

FIG. 4

POWER PROTECTION IN A MULTI-LEVEL POWER HIERARCHY

RELATED APPLICATION

This application hereby claims priority under 35 U.S.C. §119 to U.S. Provisional Patent Application No. 61/078,086, filed on 3 Jul. 2008, entitled "Power Protection in a Multi-Level Power Hierarchy," by inventors Taliver Heath and Amir Michael.

BACKGROUND

1. Field

The present embodiments relate to power-protection techniques. More specifically, the present embodiments relate to power-protection circuits for use in a multi-level power hierarchy.

2. Related Art

A wide variety of power-protection techniques, such as fuses and circuit breakers, are used to prevent circuits from being damaged in the event of an overload condition. As circuits and devices are combined into larger-scale systems, these power-protection techniques are used at different levels in these systems to provide overload protection as power from lower levels is aggregated at higher levels.

It is often difficult to provide appropriate power protection in many systems. For example, FIG. 1 presents a block diagram illustrating an embodiment of an existing data center 100, which includes a bus 110 that has a series of arms A-C. Each of these arms includes multiple devices, such as servers 116. Power protection at a high level in the data center 100 may be provided by circuit breaker 112, and at lower levels, such as in the arms A-C, by circuit breakers 114.

Within data center 100, a given server, such as server 116-1, may have a power consumption corresponding to a maximum current of 2 A, but may only use 1 A under normal operation and 0 A at idle. However, circuit breakers 112 and 114 are often set to high values corresponding to the worst-case possible power consumption. Consequently, circuit breakers 112 and 114 may be over provisioned, which significantly increases the expense of these components.

On the other hand, if lower settings are used for circuit breakers 112 and 114, the uninterrupted operation of significant portions of the data center 100 may be jeopardized. In particular, because the loads executing on the servers 116 vary over time, multiple servers 116 are often included on a given arm (such as arm B) of bus 110 to make best use of the infra-structure in data system 100. However, if one of the circuit breakers 114, such as circuit breaker 114-1, is tripped by an overload condition, multiple servers may loose power.

Additionally, it is also difficult to address this problem using software. For example, in principle software can be used to keep the data center 100 from concurrently running a set of applications that results in power spikes associated with external demands (such as requests from remote users). However, in practice software typically cannot respond fast enough to prevent such power spikes from occurring.

SUMMARY

One embodiment provides a multi-level power hierarchy that contains a higher level, which includes a first sub-circuit, and a lower level, which includes a second sub-circuit and a third sub-circuit. Moreover, the second sub-circuit and the third sub-circuit are included in branches in the power hierarchy and are separately electrically coupled to the first sub-circuit. A given sub-circuit in a given level (which can be the first sub-circuit in the higher level, the second sub-circuit in the lower level or the third sub-circuit in the lower level) includes programmable power protection which is configured to protect sub-circuits at higher levels of the power hierarchy from power variations associated with changes in load on branches at lower levels of the power hierarchy, thereby providing failure isolation in the power hierarchy.

In some embodiments, the programmable power protection is configured to protect the nodes at the higher levels of the power hierarchy from component failures on lower-level branches of the power hierarchy.

In some embodiments, a programmable protection threshold of the programmable power protection for the given sub-circuit in the given level is adjusted based on tripping of the programmable power protection for one or more sub-circuits, which can include the given sub-circuit.

Moreover, the power hierarchy may include control logic to adjust the programmable protection threshold for the given sub-circuit in the given level.

In some embodiments, a programmable protection threshold for the given sub-circuit in the given level is adjusted based on changes in the load. These changes in the load may be associated with different tasks performed by the given sub-circuit in the given level and/or may be caused by variations in processor activity in the given sub-circuit in the given level. Moreover, the adjustment may be made after a time interval has elapsed.

In some embodiments, the programmable power protection for the given sub-circuit in the given level includes multiple instances of a series combination of an electrical switch and a fuse (such as resettable or destructive fuses), where the multiple instances are electrically coupled in parallel with each other. Note that the fuses in the multiple instances may have the same protection threshold at a given time, and more than one electrical switch in the multiple instances can be closed at the given time. Alternatively, the fuses in the multiple instances may have different protection thresholds at a given time, and only one electrical switch in the multiple instances is closed at the given time.

In some embodiments, the changes in the load include dynamic load variations during operation of the second sub-circuit or the third sub-circuit.

In some embodiments, programmable protection thresholds for the second sub-circuit and the third sub-circuit are selected so that a programmable protection threshold for the first sub-circuit is not exceeded during operation of the second sub-circuit and the third sub-circuit.

In some embodiments, the programmable power protection for the given sub-circuit in the given level includes a power monitor to measure power consumption of the given sub-circuit, and a feedback circuit to adjust the programmable protection threshold for the given sub-circuit based on the measured power consumption.

In some embodiments, the programmable power protection for the given sub-circuit disables the given sub-circuit if power consumption of the given sub-circuit exceeds the programmable protection threshold for the given sub-circuit. For example, the given sub-circuit may be disabled by decoupling the given sub-circuit from a line power source. Note that the given sub-circuit may be disabled using hardware or software.

In some embodiments, the power hierarchy includes control logic which is configured to adjust power consumption of the given sub-circuit in the given level by determining which tasks to assign to the given sub-circuit.

Another embodiment provides a method for providing failure isolation in the multi-level power hierarchy that includes sub-circuits that are arranged in levels, where a sub-circuit in a higher level is separately electrically coupled to two or more sub-circuits that are included in branches on a lower level in the power hierarchy. During the method, a tripping of programmable power protection for one of the sub-circuits in the power hierarchy is detected. Then, a programmable protection threshold of the programmable power protection is adjusted so that the frequency of the tripping is reduced without increasing a frequency of tripping of another programmable power protection at the higher level in the power hierarchy.

BRIEF DESCRIPTION OF THE FIGURES

FIG. 4 is a flowchart illustrating an embodiment of a process for providing failure isolation in the multi-level power hierarchy that includes sub-circuits that are arranged in levels.

Note that like reference numerals refer to corresponding parts throughout the drawings.

DETAILED DESCRIPTION

Figure 1:
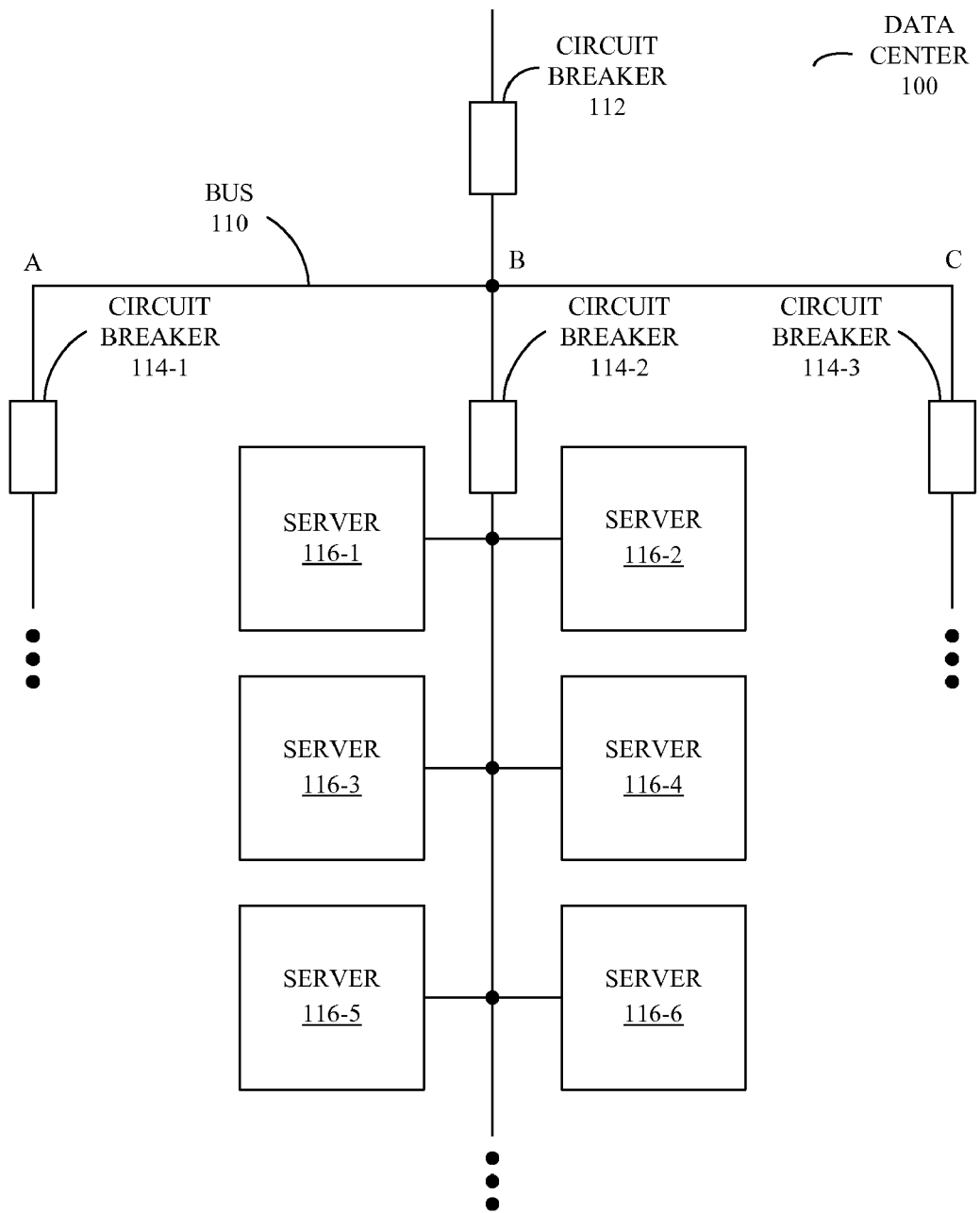
FIG. 1 is a block diagram illustrating an embodiment of an existing data center.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present disclosure is not intended to be limited to the embodiments shown, but is to be accorded the widest scope consistent with the principles and features disclosed herein.

Embodiments of a programmable power-protection circuit and a multi-level power hierarchy that includes one or more instances of the programmable power-protection circuit are described. In this power hierarchy, instances of the programmable power-protection circuit, which are included in sub-circuits on branches at lower levels in the power hierarchy, are configured to protect components (such as sub-circuits) at higher levels from power variations associated with changes in load on the branches. For example, programmable protection thresholds of one or more of the programmable power-protection circuits may be selected and/or adjusted. In this way, the power-protection circuits may provide failure isolation in the power hierarchy.

Note that changes in load may be associated with: component failures on lower-level branches; different tasks performed by one or more of the components or sub-circuits (e.g., dynamic load variations during operation of one or more of the sub-circuits); and/or may be caused by variations in processor activity in one or more of the sub-circuits. Moreover, the programmable protection thresholds for programmable power-protection circuits included in one or more components or sub-circuits in a given level in the power hierarchy may be adjusted based on: tripping of the programmable power protection of one or more of these or other programmable power-protection circuits; and/or measured power consumption in one or more of the components or sub-circuits.

In some embodiments, a given programmable power-protection circuit includes multiple instances of a series combination of an electrical switch and a fuse (such as a resettable or a destructive fuse), where the multiple instances are electrically coupled in parallel with each other. If these fuses in the multiple instances have a common protection threshold at a given time, more than one electrical switch in the multiple instances may be closed at the given time. Alternatively, if the fuses in the multiple instances have different protection thresholds at a given time (for example, binary-weighted programmable protection thresholds may be used), only one electrical switch in the multiple instances may be closed at the given time.

Furthermore, a given sub-circuit may be disabled, using hardware and/or software, if its power consumption exceeds the programmable protection threshold of the associated programmable power-protection circuit. For example, the given sub-circuit may be disabled by decoupling it from a line power source. Additionally and/or separately, control logic in the power hierarchy may adjust power consumption in one or more sub-circuits by determining the tasks assigned to these sub-circuits. For example, the sub-circuits may be servers (or computers) and the tasks may be jobs, applications or programs that execute on one or more processors.

Figure 2:
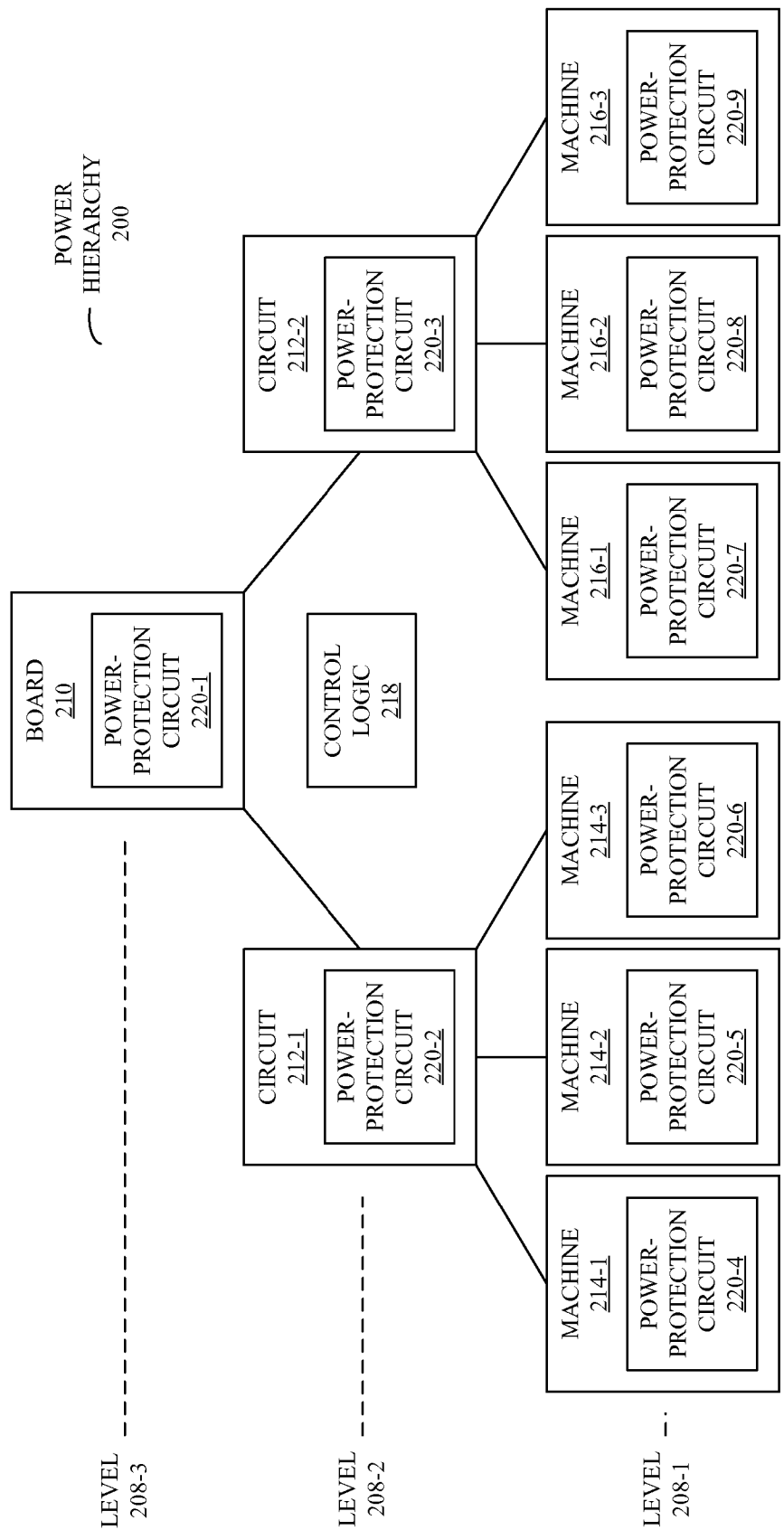
FIG. 2 is a block diagram illustrating an embodiment of a power hierarchy.

We now describe embodiments of a power hierarchy. FIG. 2 presents a block diagram illustrating an embodiment of a power hierarchy 200. At level 208-1, this power hierarchy includes sub-circuits, such as machines 214 and 216, each of which may receive power from a plug. Additionally, at level 208-2, additional sub-circuits or components, such as circuits 212, are each separately electrically coupled to groups of machines in a branch at a lower level in the power hierarchy 200 (for example, circuit 212-1 may be separately electrically coupled to machines 214). Moreover, a level 208-3, board 210 (or a bus) is separately electrically coupled to circuits 212.

At each of the levels 208, one or more components (such as board 210, circuits 212, and machines 214 and 216) may include or may be associated with programmable power-protection circuits 220. Programmable protection thresholds of the programmable power-protection circuits at a given level, such as level 208-1, may be selected and/or adjusted to protect components at higher levels, such as levels 208-2 and/or 208-3, from changes in load on components in branches at the lower levels. For example, the sum of the programmable protection thresholds of the programmable power-protection circuits of machines 214 in level 208-1 may be less than the programmable protection threshold of programmable power-protection circuit 220-2 so that this programmable protection threshold is not exceeded during operation of machines 214. In this way, the programmable power-protection circuits 220 can provide failure isolation in the power hierarchy 200. In particular, from the perspective of a higher level, it appears as if there were no power-capping or no power-protection technique used at lower levels in power hierarchy 200.

Note that selection or adjustment of the programmable protection thresholds may be based on instructions or signals provided by control logic 218 in power hierarchy 200. In some embodiments, the programmable protection thresholds are selected once (for example, during an initialization or configuration mode). However, in other embodiments the programmable protection thresholds are dynamically adjusted or adapted. These adjustments may occur after a time interval has elapsed. For example, the programmable protection threshold of a given programmable power-protection circuit, such as programmable power-protection circuit 220-4, may be adjusted every 10 s or every minute.

Alternatively, the programmable protection threshold of the given programmable power-protection circuit may be dynamically adjusted as needed. For example, the programmable protection threshold may be trained when a given component, such as machine 214-1, executes an application for the first time. Moreover, control logic 218 and/or a power monitor (not shown) in the given programmable power-protection circuit may monitor the power consumption of the given component, and the programmable protection threshold of the given programmable power-protection circuit may be adjusted accordingly. Furthermore, the programmable protection thresholds for the programmable power-protection circuits in a given level may be adjusted based on tripping of the programmable power protection of this programmable power-protection circuit and/or in other programmable power-protection circuits 220 (in the given level or other levels).

Note that changes in load may be associated with: component failures on lower-level branches; different tasks performed by one or more of the components (i.e., dynamic load variations during operation of one or more of the components); and/or may be caused by variations in processor activity in one or more of the components.

In addition to power protection, software and/or hardware may be used in power hierarchy 200 to limit the average or instantaneous power consumption. For example, tasks (such as jobs, applications, or programs) may be assigned to machines 214 and/or 216 based on the measured power consumption of a given component in level 208-1 or another level in power hierarchy 200.

However, because software is often too slow, a combination of hardware and/or software may be used to limit the power consumption in power hierarchy 200. For example, the given component may be disabled (such as by decoupling it from a line power source) if the power consumption of this component exceeds the programmable protection threshold of the given programmable power-protection circuit. As described below with reference to FIGS. 3A and 3B, this programmable protection threshold may be implemented using programmable relays (i.e., hardware controlled by software). Moreover, the given component may be disabled using hardware or software, such as based on instructions or signals provided by control logic 218.

Figure 3A:
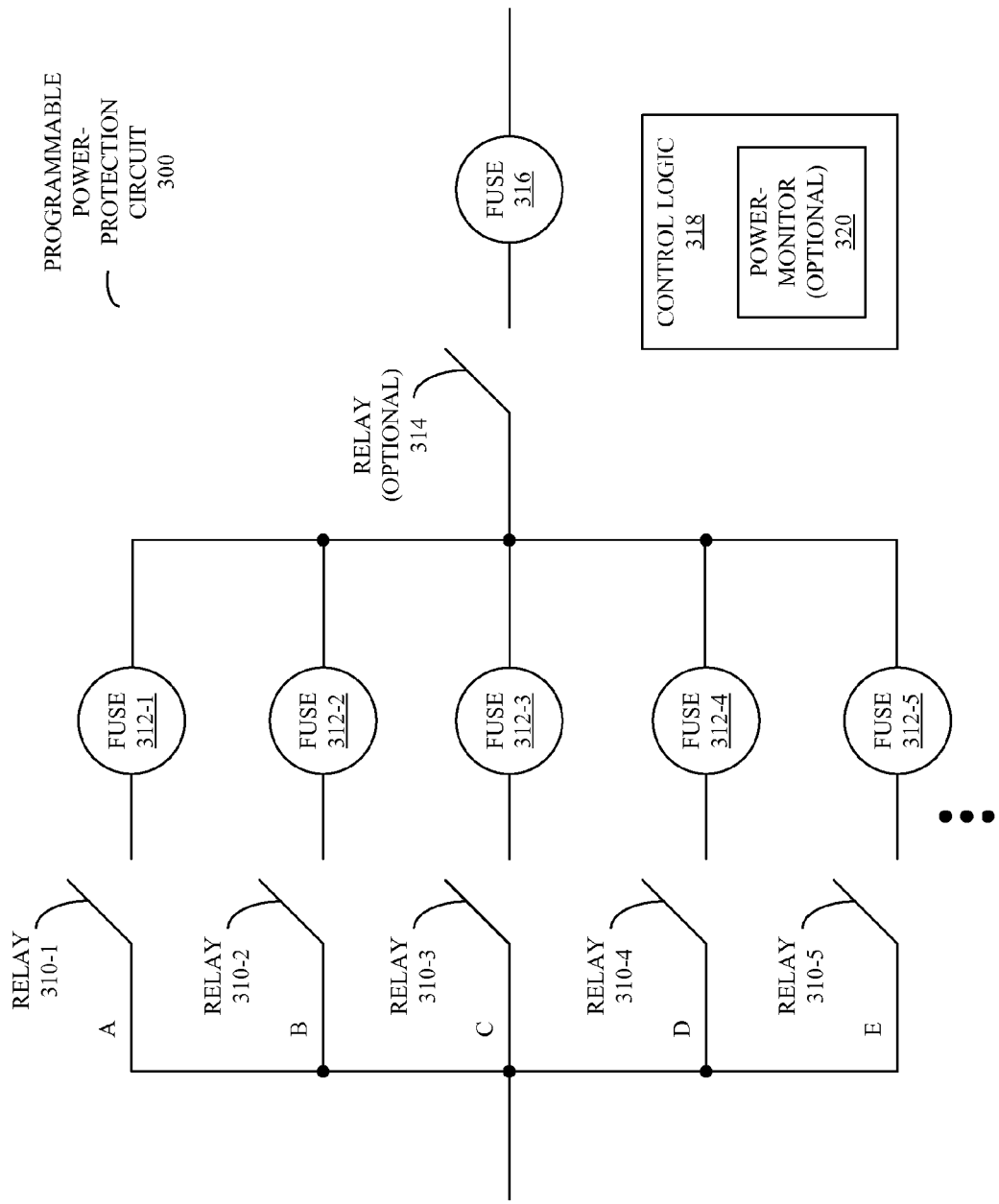
FIG. 3A is a block diagram illustrating an embodiment of a programmable power-protection circuit.

We now describe embodiments of a programmable power-protection circuit. FIG. 3A presents a block diagram illustrating an embodiment of a programmable power-protection circuit 300, which includes multiple instances (A-E) of a series combination of an electrical switch or relay (such as one of relays 310) and a fuse (such as one of fuses 312). Note that these instances are electrically coupled in parallel with each other. Moreover, fuses 312 may be resettable (such as circuit breakers) or destructive fuses. In some embodiments, fuses 312 are programmable.

Control logic 318 in or associated with programmable power-protection circuit 300 may selectively close one or more of relays 310 to select or adjust the programmable protection threshold. As noted previously, control logic 318 may include optional power monitor 320.

In some embodiments, at a given time, fuses 312 have a common protection threshold, and control logic 318 provides instructions or signals that selectively close one or more of relays 310. (As noted previously, this selecting or adjusting of the programmable protection threshold of programmable power-protection circuit 300 may be based on instructions or signals received from control logic 218 in power hierarchy 200 in FIG. 2.) For example, arms A-E may each have a protection threshold of 2 A.

Alternatively, two or more of fuses 312 may have different protection thresholds, and control logic 318 may provide instructions or signals that selectively close at most one of relays 310. For example, arms A-E may have binary-weighted protection thresholds, such as 1, 2, 4, 8 or 16 A.

Additionally, in some embodiments programmable power-protection circuit 300 includes optional relay 314 and/or fuse 316, which are in series with the multiple instances. Fuse 316 may be used to disable programmable power-protection circuit 300. Note that fuse 316 may be resettable (such as a circuit breaker) or a destructive fuse. In some embodiments, fuse 316 is programmable.

Figure 3B:
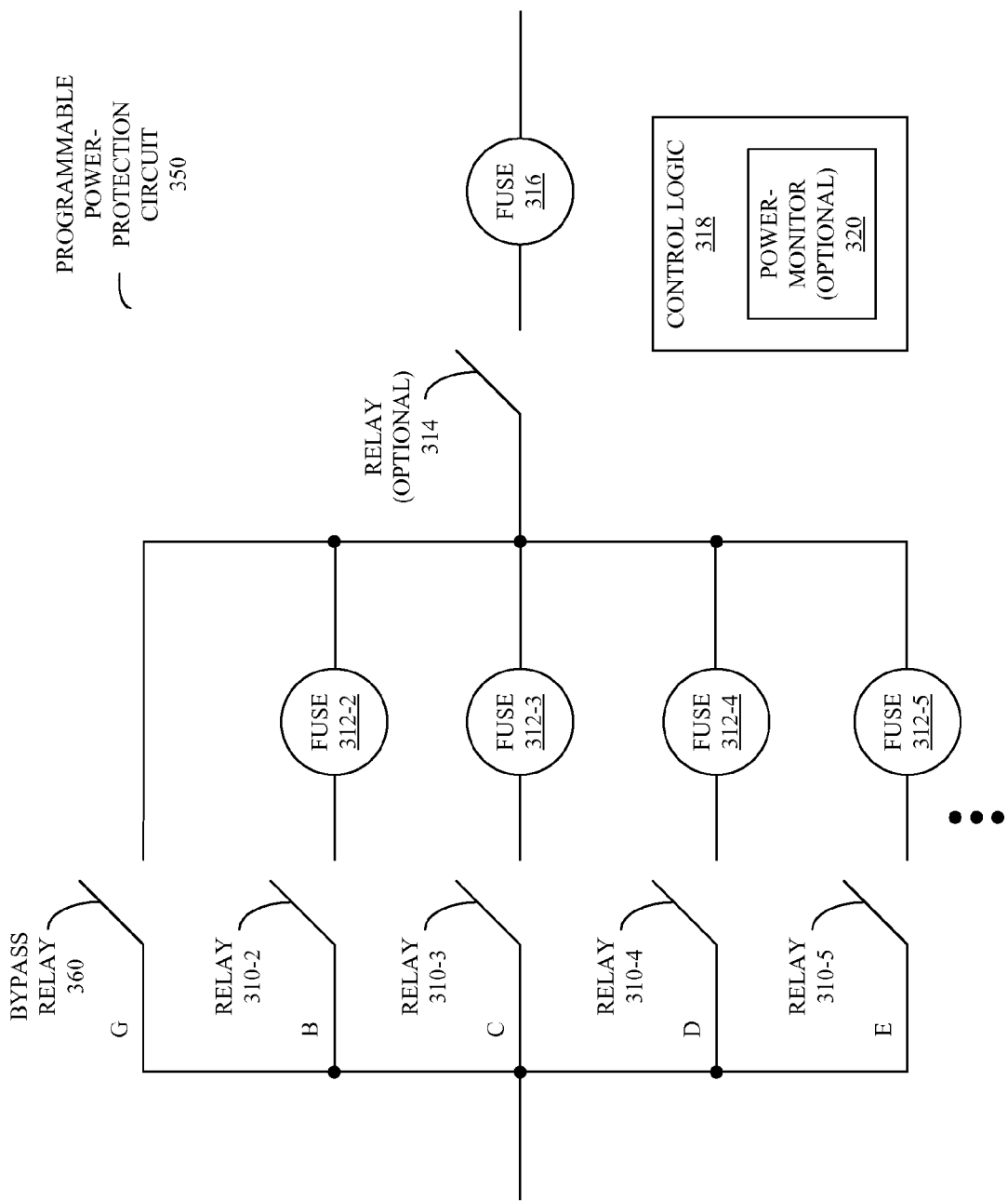
FIG. 3B is a block diagram illustrating an embodiment of a programmable power-protection circuit.

In some embodiments, a bypass relay is included in parallel with the multiple instances. This is shown in FIG. 3B, which presents a block diagram illustrating an embodiment of a programmable power-protection circuit 350. In particular, bypass relay 360 is included in arm G, which does not include a fuse. This bypass relay may be used to re-energize programmable power-protection circuit 350 in the event that any of the fuses 312 are tripped or if there is a problem with any of the fuses 312.

In some embodiments, power hierarchy 200 (FIG. 2), programmable power-protection circuit 300 (FIG. 3A) and programmable power-protection 350 include fewer or additional components. Moreover, two or more components may be combined into a single component and/or a position of one or more components may be changed.

Components and/or functionality illustrated in these embodiments may be implemented using analog circuits and/or digital circuits. Moreover, circuits may include bipolar transistors and/or field-effect transistors, and these components may use PMOS and/or NMOS. Furthermore, components and/or functionality in power hierarchy 200 (FIG. 2), programmable power-protection circuit 300 (FIG. 3A), and/or programmable power-protection circuit 350 may be implemented using hardware and/or software.

Moreover, additional power-protection techniques may be used, either in conjunction with one or more of the preceding embodiments or separately from these embodiments. For example, programmable power-protection circuits 220 (FIG. 2) may include instantaneous power monitoring and feedback control at multiple power levels 208 in power hierarchy 200 (FIG. 2). Moreover, power consumption of a given component in power hierarchy 200 (FIG. 2) may, at least in part, be implemented through either the design of the associated power supply and/or the software control of this power supply. Additionally, software in control logic 218 (FIG. 2) may determine which tasks are assigned to the given component, and a probabilistic model (such as a state machine) may be used to provide guarantees that the associated programmable protection threshold will not be violated.

We now describe exemplary embodiments of the power hierarchy and the programmable power-protection circuit. Referring to FIG. 2, in some embodiments, programmable power-protection circuits 220 are used to set programmable protection thresholds that are below the critical or worst-case power consumption of power hierarchy 200, but which do not result in tripping of the programmable power-protection circuits 220.

In an exemplary embodiment, there are twenty machines 214 and twenty machines 216. At a given time, up to fifteen of machines 214 and up to fifteen of machines 216 can operate.

Moreover, the programmable protection threshold associated with board 210 is 15 A, and the programmable protection thresholds associated with circuits 212 are each 15 A.

Referring to FIG. 3A, in an exemplary embodiment there are six instances of the series combination of relays 310 and fuses 312 (i.e., instances A-F). Fuse 312-1 in instance A and fuse 312-6 in instance F may each be 10 A, while the remaining fuses (in instances B-E) may each be 2 A. Thus, based on instructions or signals from control logic 318 (and/or from control logic 218 in FIG. 2), selected relays 310 may be opened to set a programmable protection threshold of 2, 4, 6 or 8 A.

Referring back to FIG. 2, during operation of power hierarchy 200, the maximum power consumption of circuit 212-1 may be determined to be 6 A by control logic 218 and/or by control logic in programmable power-protection circuit 220-2, and the maximum power consumption of circuit 212-2 may be determined to be 8 A by control logic 218 and/or by control logic in programmable power-protection circuit 220-3.

Then, control logic 218 and/or control logic in programmable power-protection circuit 220-2 may close three relays in programmable power-protection circuit 220-2 such that three 2 A fuses are electrically coupled in parallel. Similarly, control logic 218 and/or control logic in programmable power-protection circuit 220-3 may close four relays in programmable power-protection circuit 220-3 such that four 2 A fuses are electrically coupled in parallel.

If the programmable protection threshold of programmable power-protection circuit 220-1 is set to 15 A then an unintentional power spike to circuit 212-1 and/or 212-2 will not trip programmable power-protection circuit 220-1.

Note that if control logic 218 or software executing remotely from power hierarchy 200 needs to shift the load around (for example, if different tasks will be executed on machines 214 versus machines 216), the load on circuit 212-2 may first be reduced. Then, relay settings in programmable power-protection circuit 220-2 may be increased by closing additional relays before adding load to machines 214.

We now describe embodiments of a process for providing failure isolation. FIG. 4 presents a flowchart illustrating an embodiment of a process 400 for providing failure isolation in the multi-level power hierarchy that includes sub-circuits that are arranged in levels. Note that a sub-circuit in a higher level may be separately electrically coupled to two or more sub-circuits that are included in branches on a lower level in the power hierarchy. During the method, tripping of programmable power protection for one of the sub-circuits in the power hierarchy is detected (410). Then, a programmable protection threshold of the programmable power protection is adjusted so that the frequency of the tripping is reduced without increasing a frequency of tripping of another programmable power protection at the higher level in the power hierarchy (412).

In some embodiments, process 400 includes additional or fewer operations. Moreover, the order of the operations may be changed and/or two or more operations may be combined into a single operation.

While the preceding embodiments have used power hierarchies, such as data centers, as an illustration, these power-protection techniques may be used in a wide variety of electronic devices and systems.

The foregoing descriptions of embodiments have been presented for purposes of illustration and description only. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A multi-level power hierarchy, comprising:
   a higher level which includes a first sub-circuit; and
   a lower level which includes a second sub-circuit and a third sub-circuit, wherein the second sub-circuit and the third sub-circuit are included in branches in the power hierarchy and are separately electrically coupled to the first sub-circuit; and
   wherein a given sub-circuit in a given level includes programmable power protection which is configured to protect sub-circuits at higher levels of the power hierarchy from power variations associated with changes in load on branches at lower levels of the power hierarchy; and
   wherein the programmable power protection for the given sub-circuit in the given level includes multiple instances of a series combination of an electrical switch and a fuse, wherein the multiple instances are electrically coupled in parallel with each other between a shared first node and a shared second node within the given sub-circuit.

2. The circuit of claim 1, wherein the programmable power protection is configured to protect the nodes at the higher levels of the power hierarchy from component failures on lower-level branches of the power hierarchy.

3. The circuit of claim 1, wherein a programmable protection threshold of the programmable power protection for the given sub-circuit in the given level is adjusted based on tripping of the programmable power protection for one or more sub-circuits, which can include the given sub-circuit.

4. The circuit of claim 3, further comprising control logic to adjust the programmable protection threshold for the given sub-circuit in the given level.

5. The circuit of claim 1, wherein a programmable protection threshold for the given sub-circuit in the given level is adjusted based on changes in the load.

6. The circuit of claim 5, wherein the changes in the load are associated with different tasks performed by the given sub-circuit in the given level.

7. The circuit of claim 5, wherein the changes in the load are caused by variations in processor activity in the given sub-circuit in the given level.

8. The circuit of claim 5, wherein the adjustment is made after a time interval has elapsed.

9. The circuit of claim 5, further comprising control logic to adjust the programmable protection threshold for the given sub-circuit in the given level.

10. The circuit of claim 1, wherein the fuses in the multiple instances have a common protection threshold at a given time, and more than one electrical switch in the multiple instances can be closed at the given time.

11. The circuit of claim 1, wherein the fuses in the multiple instances have different protection thresholds at a given time, and only one electrical switch in the multiple instances is closed at the given time.

12. The circuit of claim 1, wherein the fuses are resettable or destructive fuses.

13. The circuit of claim 1, wherein the changes in the load include dynamic load variations during operation of the second sub-circuit or the third sub-circuit.

14. The circuit of claim 1, wherein programmable protection thresholds for the second sub-circuit and the third sub-circuit are selected so that a programmable protection threshold for the first sub-circuit is not exceeded during operation of the second sub-circuit and the third sub-circuit.

15. The circuit of claim 1, wherein the programmable power protection for the given sub-circuit in the given level includes a power monitor to measure power consumption of the given sub-circuit and a feedback circuit to adjust the programmable protection threshold for the given sub-circuit based on the measured power consumption.

16. The circuit of claim 1, wherein the programmable power protection for the given sub-circuit disables the given sub-circuit if power consumption of the given sub-circuit exceeds the programmable protection threshold for the given sub-circuit.

17. The circuit of claim 16, wherein the given sub-circuit is disabled by decoupling the given sub-circuit from a line power source.

18. The circuit of claim 16, wherein the given sub-circuit is disabled using hardware or software.

19. The circuit of claim 1, further comprising control logic which is configured to adjust power consumption of the given sub-circuit in the given level by determining which tasks to assign to the given sub-circuit.

20. A multi-level power hierarchy, comprising:
   a higher level which includes a first sub-circuit; and
   a lower level which includes a second sub-circuit and a third sub-circuit, wherein the second sub-circuit and the third sub-circuit are included in branches in the power hierarchy and are separately electrically coupled to the first sub-circuit; and
   wherein a given sub-circuit in a given level includes a means for protecting sub-circuits at higher levels of the power hierarchy from power variations associated with changes in load on branches at lower levels of the power hierarchy; and
   wherein the means for protecting in a given level comprises multiple instances of a series combination of an electrical switch and a fuse, wherein the multiple instances are electrically coupled in parallel with each other between a shared first node and a shared second node within the given sub-circuit.

21. A method for providing failure isolation in a multi-level power hierarchy that includes sub-circuits that are arranged in levels, wherein a sub-circuit in a higher level is separately electrically coupled to two or more sub-circuits that are included in branches on a lower level in the power hierarchy, comprising:
   detecting a tripping of programmable power protection for one of the sub-circuits in the power hierarchy; and
   adjusting a programmable protection threshold of the programmable power protection so that the frequency of the tripping is reduced without increasing a frequency of tripping of another programmable power protection at the higher level in the power hierarchy, wherein adjusting the programmable power protection comprises configuring multiple instances of a series combination of an electrical switch and a fuse that are electrically coupled in parallel with each other between a shared first node and a shared second node in the programmable power protection so that the frequency of the tripping is reduced without increasing the frequency of tripping of another programmable power protection at the higher level.

* * * * *